UNITED STATES PATENT OFFICE 2,511,019

VAT DYES OF THE ANTHRAQUINONE 1,3,4-OXDIAZOLE SERIES

Frederic B. Stilmar, Wilmington, Del., assignor to E. I. du Pont de Nemours & Company, Wilmington, Del., a corporation of Delaware No Drawing. Application March 15, 1949, Serial No. 81,620

1 Claim. (Cl. 260—307.5)

This invention relates to the preparation of a new red vat dye of the anthraquinone series, and more particularly to a bis-anthraquinone-oxdiazole.

A continuous effort has been made for a number of years to produce in the anthraquinone vat dye series a red dye which would dye in bright red shades and have the excellent fastness properties characteristic in general of the anthraquinone vat dyes. While several red dyes have been produced in the anthraquinone series, those so far available commercially are either lacking in strength or brightness or in their fastness properties such as fastness to light, bleach, laundering, etc.

It is an object of the present invention to produce a red vat dye in the anthraquinone series which dyes in strong and relatively bright red shades and which shows good general fastness properties. A more particular object of the invention is to produce a red dyestuff of the anthraquinone series having very desirable dyeing and fastness properties, which has the general formula:

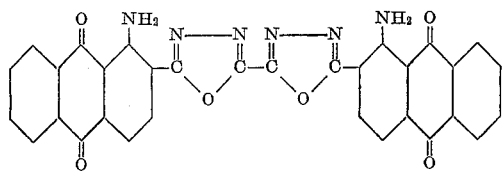

The new vat dye of this invention may be prepared by reacting 1-nitroanthraquinone-2-carbonyl hydrazine with oxalyl chloride to produce the bis-hydrazide of the formula:

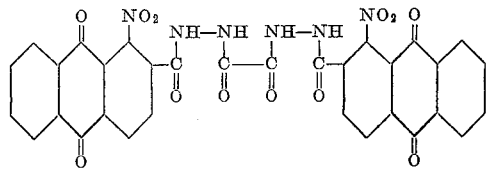

which, in turn, is ring closed by means of acid condensing agents to the bis-oxdiazole of the formula:

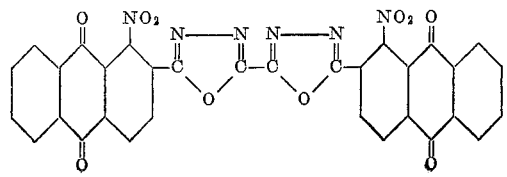

The nitro groups in the 1-position on the anthraquinone nuclei are then converted to amino groups by reacting the nitro compound with ammonia.

The following examples are given to illustrate the invention. The parts used are by weight, unless otherwise specified.

Example 1

7.6 parts of oxalyl chloride, 41.5 parts of 1-nitroanthraquinone-2-carbonyl hydrazine and 350 parts of orthodichlorobenzene are heated to 165° C. for 2 hours. The mass is filtered at 100° C., and the resulting filter cake is washed with benzene. The oxalyl-bis(1-nitroanthraquinone-2-carbonyl hydrazine) is obtained in the form of colorless plates having a melting point of 313°-315° C. It has the formula:

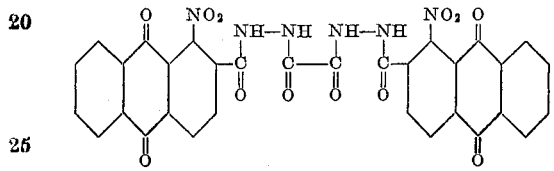

By using 1-aminoanthraquinone-2-carbonyl hydrazine and oxalyl chloride in the above example, there is obtained the corresponding diamino compound of the formula:

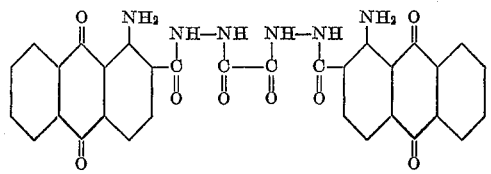

Example 2

Fifteen (15) parts of oxalyl bis-(1-nitroanthraquinone-2-carbonyl hydrazine), obtained as in Example 1, 45 parts of thionyl chloride, and 250 parts of nitrobenzene are heated at 165°-170° C. for 6 hours. The mass is filtered, washed with benzene and dried. The bis-(1-nitroanthraquinone oxdiazole) thus obtained is in the form of yellowish chunky crystals. It has the formula:

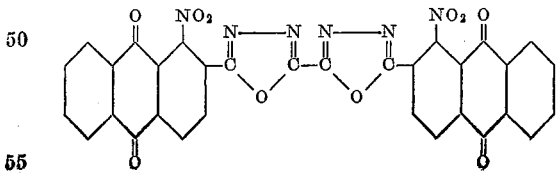

Example 3

Five (5) parts of the product of Example 2 are suspended in 350 parts of nitrobenzene. Ammonia is passed through the reaction mixture at 170°–180° C. for 2 hours. The resulting product, which consists of long bluish-red crystals, is filtered off, washed with benzene and dried. It has the formula:

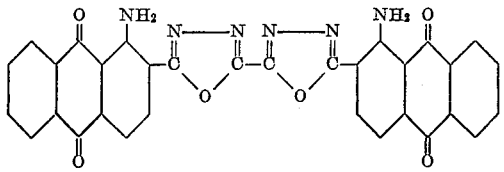

This bis-(1-aminoanthraquinone-oxdiazole) dissolves in sulfuric acid with a weak yellow color and dyes cotton in strong bluish-red shades from a violet alkaline hydrosulfite vat. It shows good fastness to light, bleach and washing when tested by the usual standard tests.

The reaction of the anthraquinone-2-carbonyl hydrazine with the oxalyl chloride may be carried out in any inert solvent such as nitrobenzene, trichlorobenzene, etc., at temperatures of from 150° to 200° C. The thionyl chloride used in the above examples to effect ring closure of the hydrazide to the oxdiazole may be replaced by other acid condensing agents such as phosphorus oxychloride, p-toluene sulfonic acid or the like. The ring closure of the hydrazides to the oxdiazoles is preferably effected at temperatures of 150° to 210° C. This ring closure may be carried out in any of the usual inert organic solvents such as aromatic hydrocarbons and their nitrated and chlorinated derivatives. When desired, the ring closure reaction may be carried out without isolation of the hydrazide from the organic reaction medium in which it is formed.

I claim:

The bis-(1-aminoanthraquinoneoxdiazole) of the formula:

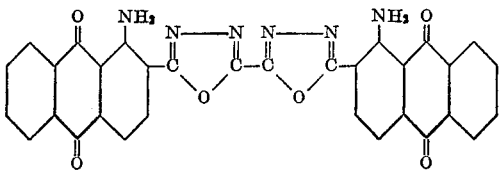

which dissolves in sulfuric acid with a weak yellow color and dyes cotton from a violet alkaline hydrosulfite vat in bluish-red shades of good fastness properties.

FREDERIC B. STILMAR.

REFERENCES CITED

The following references are of record in the file of this patent:

UNITED STATES PATENTS

| Number | Name | Date |
|---|---|---|
| 2,464,831 | Stilmar | Mar. 22, 1949 |